United States Patent [19]

Hefner, Jr.

[11] Patent Number: 4,486,582

[45] Date of Patent: Dec. 4, 1984

[54] REACTIVE MONOMERS AND THERMOSETTABLE COMPOSITIONS CONTAINING SAME

[75] Inventor: Robert E. Hefner, Jr., Freeport, Tex.

[73] Assignee: The Dow Chemical Company, Midland, Mich.

[21] Appl. No.: 461,342

[22] Filed: Jan. 27, 1983

[51] Int. Cl.$^3$ ............... C08F 26/02; C08F 126/02; C08F 222/02

[52] U.S. Cl. .................................. 526/301

[58] Field of Search ............ 526/301, 302, 288; 525/455

[56] References Cited

U.S. PATENT DOCUMENTS

| | | | |
|---|---|---|---|
| 2,846,416 | 8/1958 | Arnold et al. | 525/455 |
| 3,043,801 | 7/1962 | Wagner et al. | 525/127 |
| 3,133,902 | 5/1964 | Denchfield et al. | 526/301 |
| 3,297,745 | 1/1967 | Fekete et al. | 260/471 |
| 3,457,324 | 7/1969 | Sekmakas | 525/455 |

Primary Examiner—Joseph L. Schofer
Assistant Examiner—Peter F. Kulkosky
Attorney, Agent, or Firm—James G. Carter

[57] ABSTRACT

Reactive monomers are prepared by reacting (1) an aromatic compound containing a polymerizable ethylenically unsaturated group and a group containing a hydrogen atom reactive with an NCO or NCS group, (2) a compound having at least one oxyalkylene group and at least one group containing at least one hydrogen atom reactive with an NCO or an NCS group and (3) a compound having an average of more than one NCO and/or NCS groups per molecule. These reactive monomers are useful as reactive modifiers for polyester and vinyl ester resins.

32 Claims, No Drawings

REACTIVE MONOMERS AND THERMOSETTABLE COMPOSITIONS CONTAINING SAME

BACKGROUND OF THE INVENTION

The present invention pertains to ethylenically unsaturated monomers, polymers prepared therefrom and thermosettable resin compositions containing same.

Unsaturated polyester and vinyl ester resins are well known and have many useful properties. However, they are usually somewhat deficient in some properties such as elongation and impact strength. The present invention provides a reactive monomer which provides such resins with an improvement in one or more of its properties such as, for example, elongation, ductility and impact strength.

SUMMARY OF THE INVENTION

One aspect of the present invention concerns an ethylenically unsaturated monomer resulting from reacting (A) an aromatic material containing, per molecule, one polymerizable ethylenically unsaturated group and one group containing a hydrogen atom reactive with —NCO and/or —NCS groups;

(B) a material containing at least one oxyalkylene group and is terminated in a group having at least one hydrogen atom which is reactive with —NCO and/or —NCS groups; and (C) a material having an average of more than one —NCO and/or —NCS group per molecule; and wherein the components are employed in quantities which provides an equivalent ratio of A:B of from about 0.1:1 to about 5:1, preferably from about 1:1 to about 3:1, most preferably from about 1.75:1 to about 2.25:1 and an equivalent ratio of C:B of from about 0.1:1 to about 5:1, preferably from about 1:1 to about 3:1, most preferably from about 1.75:1 to about 2.25:1.

The ethylenically unsaturated monomer can be prepared by reacting the three component materials in any order, i.e. reacting Component A with Component C and then reacting the resultant product with Component B or by reacting Component B with Component C and then reacting the resultant product with Component A or mixing all three components together and conducting the reaction. Staged addition of all or a part of the components is also operable.

Another aspect of the present invention concerns polymers prepared by polymerizing one or more of any of the aforementioned monomers optionally in the presence of one or more non-resinous monomers containing a polymerizable ethylenically unsaturated group.

Still another aspect of the present invention concerns a composition which when admixed with a suitable quantity of a catalyst system therefor thermosets to a cured condition, which composition comprises (A) an unsaturated polyester resin or vinyl ester resin or mixture of either or both of such resins;

(B) at least one of the aforementioned polymerizable monomers and (C) a polymerizable ethylenically unsaturated non-resinous monomer different from Component (B) and wherein (i) Component (A) is present in a quantity of from about zero to about 95, preferably from about 20 to about 80, most preferably from about 40 to about 60 percent by weight of the combined weight of Components (A), (B) and (C);

(ii) Component (B) is present in quantities of from about 1 to about 95, preferably from about 1 to about 25, most preferably from about 1 to about 15 percent by weight of the combined weight of Components (A), (B) and (C); and (iii) Component (C) is present in quantities of from zero to about 95, preferably from about 15 to about 75, most preferably from about 25 to about 55 percent by weight of the combined weight of Components (A), (B) and (C).

DETAILED DESCRIPTION OF THE INVENTION

Suitable aromatic materials containing, per molecule, one polymerizable ethylenically unsaturated group and one group containing a hydrogen atom reactive with an —NCO and/or —NCS group includes but is not limited to those represented by the formula

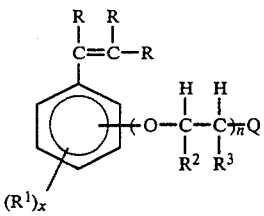

wherein each R and $R^1$ group is independently selected from hydrogen or a saturated hydrocarbyl group having from 1 to about 10, preferably from 1 to about 4 carbon atoms; each $R^2$ and $R^3$ is independently hydrogen or an alkyl group having from 1 to about 4 carbon atoms; Q is a group having a hydrogen atom reactive with an —NCO and/or an —NCS group such as, for example, hydroxyl or a primary or secondary amine group; n has a value from zero to about 100 and x has a value from zero to 3.

The term hydrocarbyl as employed herein refers to groups such as alkyl, cycloalkyl, aryl, alkaryl, and aralkyl.

Suitable materials containing at least one oxyalkylene group and is terminated in a group having at least one hydrogen atom which is reactive with —NCO and/or —NCS groups include adducts of alkylene oxides, aryl substituted alkylene oxides or halogen substituted alkylene oxides with aliphatic, cycloaliphatic, or aromatic initiator compounds having at least one hydrogen atom reactive with alkylene oxides, epoxy-containing materials such as epihalohydrins, styrene oxide and the like.

Suitable such initiator compounds include aliphatic alcohols and thiols, aliphatic diols and dithiols, mono- and polyhydric aromatic compounds such as phenols, bisphenols, novolac resins and the like.

Particularly suitable as initiator compounds are those having from 2 to about 8 hydrogen atoms reactive with alkylene oxides or substituted alkylene oxides which initiator compounds include, for example, water, ethylene glycol, propylene glycol, butanediol, hexanediol, glycerine, trimethylol propane, pentaerythritol, hexanetriol, sorbitol, sucrose, hydroquinone, resorcinol, catechol, bisphenols, novolac resins, phosphoric acid, mixtures thereof and the like. Particularly suitable alkylene oxides include, ethylene oxide, 1,2-propylene oxide, 1,2-butylene oxide, 2,3-butylene oxide, mixtures thereof and the like.

Also suitable as initiators for the relatively high equivalent weight polyols include, for example, ammonia, ethylenediamine, diaminopropanes, diaminobutanes, diaminopentanes, diaminohexanes, diethylenetriamine, triethylenetetramine, tetraethylenepentamine, pentaethylenehexamine, ethanolamine, aminoethylethanolamine, aniline, 2,4-toluenediamine, 2,6-toluenediamine, diaminodiphenyloxide (oxydianiline), 2,4'-diaminodiphenylmethane, 4,4'-diaminodiphenylmethane, 1,3-phenylenediamine, 1,4-phenylenediamine, naphthylene-1,5-diamine, triphenylmethane-4,4',4''-triamine, 4,4-di(methylamino)diphenylmethane, 1-methyl-2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane and amine aldehyde condensation products such as the polyphenyl-polymethylene polyamines produced from aniline and formaldehyde, mixtures thereof and the like.

Polyester polyols are also suitable as the material containing at least one oxyalkylene group and at least one group containing a hydrogen atom reactive with an —NCO and/or —NCS group.

Suitable polyester polyols which may be employed herein include, for example, those prepared by reacting a polycarboxylic acid or anhydride thereof with a polyhydric alcohol. The polycarboxylic acids may be aliphatic, cycloaliphatic, aromatic and/or heterocyclic and may be substituted (e.g. with halogen atom) and/or unsaturated. Examples of carboxylic acids of this kind include succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids; such as oleic acid, which may be in admixture with monomeric fatty acids, terephthalic acid dimethyl ester; terephthalic acid bisglycol ester and the like. Mixtures of such acids or anhydrides may also be employed.

Examples of suitable polyhydric alcohols include ethylene glycol, 1,2-propylene glycol; 1,3-propylene glycol; 1,4-, 1,2- and 2,3-butylene glycol; 1,6-hexane diol; 1,8-octane diol; neopentyl glycol; cyclohexane dimethanol (1,4-bis-hydroxymethyl cyclohexane) 2-methyl-1,3-propane diol; glycerol; trimethylol propane; 1,2,6-hexanetriol; 1,2,4-butanetriol; trimethylol ethane; pentaerythritol; quinitol; mannitol; sorbitol; methyl glycoside; diethylene glycol; triethylene glycol; tetraethylene glycol; polyethylene glycol; dipropylene glycol; polypropylene glycols; dibutylene glycol; polybutylene glycols and the like. The polyesters may contain some terminal carboxyl groups. It is also possible to use polyesters of lactones such as caprolactone, or hydroxy carboxylic acids such as hydroxy caproic acid.

Suitable polyisocyanates include the organic aromatic aliphatic, cycloaliphatic, and polycycloaliphatic polyisocyanates or mixtures thereof.

Suitable organic aromatic polyisocyanates which can be employed herein include, for example, any such polyisocyanate having 2 or more NCO groups per molecule such as, for example, 2,4-toluenediisocyanate, 2,6-toluenediisocyanate, p,p'-diphenylmethanediisocyanate, p-phenylenediisocyanate, naphthalenediisocyanate, polymethylene polyphenylisocyanates, mixtures thereof and the like.

Also suitable are organic aromatic polyisocyanates and the quasi-prepolymers prepared from such polyisocyanates and compounds having 2 or more active hydrogen atoms.

Suitable organic aliphatic, cycloaliphatic, or polycycloaliphatic polyisocyanates include, in addition to the hydrogenated derivatives of the above mentioned organic aromatic polyisocyanates, include 1,6-hexamethylene diisocyanate, 1,4-cyclohexyl diisocyanate, 1,4-bisisocyanatomethyl-cyclohexane, the diisocyanate of bis-(amino)dimethylthiabicyclononane, mixtures thereof and the like, as well as quasi-prepolymers prepared from such polyisocyanates and compounds having 2 or more active hydrogen atoms.

Also suitable are the corresponding polyisothiocyanates.

The unsaturated polyester resins suitable for use herein are well known and are described in Kirk-Othmer Encyclopedia of Chemical Technology, 3rd edition, pp. 575–594 which is incorporated herein by reference.

The unsaturated polyesteramide resins suitable for use herein are prepared by substitution of a portion of the polyol with a suitable polyamine or mixture of polyamines.

The norbornyl (dicyclopentadiene) modified unsaturated polyesters which can be used herein can be prepared by the methods described in U.S. Pat. Nos. 4,189,548 or 4,167,542 and 4,148,765.

The norbornyl (dicyclopentadiene) modified unsaturated polyesteramides which can be used herein can be prepared by the methods described herein.

The polyols used in either polyesters or polyesteramides are from the class of those having the formula: HO—$R_4$—OH where $R_4$ is a divalent organic radical selected from the group consisting of alkylene, ether-linked alkylene, ether-linked arylene, cycloalkylene, polycycloalkylene, bis(alkyl)cycloalkylene, bis(alkyl)polycycloalkylene, and arylene. Mixtures of two or more of such polyols can also be used.

The polyamines used to make polyesteramides are from the class of those having the formula:

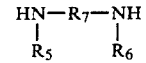

wherein $R_5$ and $R_6$ are independently selected from the group consisting of hydrogen, aliphatic, cycloaliphatic and aromatic radicals, or $R_5$ and $R_6$ taken together with the remainder of the molecule form an aliphatic ring; and $R_7$ is a divalent organic radical selected from the group consisting of alkylene, ether-linked alkylene, ether-linked arylene, alkylene amino-linked alkylene, alkylene amino-linked cycloalkylene, cycloalkylene, polycycloalkylene, arylene, alkylarylene, bis(alkyl)cycloalkylene and bis(alkyl)polycycloalkylene. Mixtures of two or more of such polyamines can also be used.

Typical diamines that are useful are ethylene diamine, propylene diamine, hexane-1,6-diamine, piperazine, 4,4'-methylenebis(cyclohexylamine), 2,2'-bis(4-aminocyclohexyl)propane, 4,4'-diaminodiphenyl ether, bis(aminomethyl)norbornane, toluene diamine, bis(aminomethyl)dicyclopentadiene and homopiperazine.

Typical polyamines are aminoethylpiperazine and diethylenetriamine.

Representatives of the useful diols are: ethylene glycol, propylene glycol, diethylene glycol, dipropylene glycol, dicyclopentadiene dimethanol, bis(hydroxymethyl)norbornane, methyl cyclohexanedimethanol, bis(hydroxypropyl)bisphenol A and other hydroxyalkylated bisphenols. Typical polyols are pentaerythritol and glycerine propoxylates.

The $\alpha,\beta$-unsaturated polycarboxylic acid is preferably maleic acid, fumaric acid, the anhydride of maleic acid or mixtures of these compounds. Such acids are readily available, have good reactivity with the diol and/or the diamine, and result in products of good properties. Other less preferred polycarboxylic acids include itaconic acid, citraconic acid, and the like.

Part of the $\alpha,\beta$-unsaturated polycarboxylic acid may be replaced with a saturated or aromatic polycarboxylic acid to vary the crosslinking potential and physical properties of the modified unsaturated polyester or polyesteramide. Such acids include the aliphatic acids such as adipic acid and the aromatic acids such as isophthalic acid. Replacement of part of the $\alpha,\beta$-unsaturated acid with such acids is commonplace in the polyester art. Suitable selection of the acid and the amount necessary to achieve a desired purpose will be known to the skilled worker and can be optimized with simple preliminary experiments.

The total amount of acid varies as a function of the total polyol or mixture of polyol and polyamine and norbornyl ingredients used.

The terminal group used to modify the polyester or polyesteramide is a norbornyl radical. Dicyclopentadiene (DCPD) is a most preferred norbornyl functional material to be employed in terminating one or both ends of the chain. Polycyclopentadiene (i.e., DCPD oligomers) or dicylopentadiene monoalcohol are also preferred species.

DCPD is sold commercially as a product of about 97 or greater percent purity. It is also sold as a $C_{10}$ hydrocarbon concentrate prepared by dimerizing a crude $C_5$ stream from the cracking of hydrocarbons as taught in U.S. Pat. No. 3,557,239.

Examples of some of the dimers which have been identified in these concentrates are the Diels-Alder adducts of two moles of isoprene (isoprene dimers), the adduct of cyclopentadiene and isoprene, the adduct of cyclopentadiene and piperylene and the like.

Either the $C_{10}$ concentrate or the relatively pure DCPD may be employed in preparing the modified polyesters or polyesteramides.

The modified unsaturated polyesters or polyesteramides can be prepared by a variety of techniques. In a preferred method, molten $\alpha,\beta$-unsaturated carboxylic anhydride is partially hydrolyzed with less than the stoichiometric equivalent of water and reacted with the norbornyl derivative to form an ester of that derivative and containing unesterified acid and anhydride. This reaction may conveniently be performed in stages whereby a reactant is added stepwise to control reaction exotherms. The product mixture is then reacted with the polyol and polyamine or the polyol alone to result in the desired modified unsaturated polyesters or polyesteramides.

In a typical procedure, molten maleic anhydride and a fraction of the stoichiometric equivalent of water is maintained at an elevated temperature of from about 60° to 130° C. The initial fractional equivalent of dicyclopentadiene (DCPD) is then added and allowed to react. A second fractional equivalent of water and of DCPD is added and allowed to react. Additional fractional equivalents of DCPD are added and each allowed to react before addition of the next increment until the desired amount of DCPD has been added. The number of fractional equivalents can be increased and the size of each fractional equivalent correspondingly decreased to any desired number of fractional equivalents, including continuous addition. The relative size of the fractional equivalents can vary.

The amount of maleic (or other) anhydride employed in this first esterification step may be equal to the equivalent of DCPD in which event the product is essentially all ester. Alternatively, the amount of anhydride may be the equivalent needed to make the ester plus that excess that is to be used in the subsequent esterification or esteramidation step.

To the mixture of esterified DCPD and acid and/or anhydride is added the polyol and polyamine or the polyol alone. After addition of the polyol and polyamine or the polyol alone is complete, the reaction can be driven to maximum yield by maintaining or increasing the temperature until the desired acid number has been reached. Typically, acid numbers of 15 to 35 are preferred, with acid numbers of 15 to 25 being most preferred; although acid numbers that are higher or lower may be tolerated, and, in some instances, may be desired.

In an equally preferred method, molten $\alpha,\beta$-unsaturated carboxylic anhydride is essentially totally hydrolyzed with a stoichiometric or greater equivalent of water and reacted with the norbornyl derivative to form an ester of that derivative and containing unesterified acid. This reaction may conveniently be performed in stages whereby a reactant is added stepwise, controlling reaction exotherms. The product mixture is then reacted with the polyol and polyamine or the polyol alone to result in the desired modified unsaturated polyester or polyesteramide.

In a typical procedure, molten maleic anhydride and the stoichiometric or greater equivalent of water are maintained at an elevated temperature from about 50° to 150° C. The temperature is allowed to stabilize at about 120° to 125° C. and the initial fractional equivalent of DCPD is then added and allowed to react. A second fractional equivalent of DCPD is added and allowed to react. Additional fractional equivalents of DCPD are added and each allowed to react before addition of the next increment until the desired amount of DCPD has been added.

The amount of maleic (or other) anhydride employed in this first esterification step may be equal to the equivalent of DCPD in which event the product is essentially all ester. Alternatively, the amount of anhydride may be the equivalent needed to make the ester plus that excess that is to be used in the subsequent esterification or esteramidation step.

The polyol and polyamine or the polyol alone are added to the mixture of esterified DCPD and acid as previously described.

Many other alternate methods will be recognized by the skilled worker. For example, molten maleic anhydride may be added to a mixture of DCPD and water in a reactor. The polyol and polyamine or the polyol alone are added to the mixture of esterified DCPD and acid and/or anhydride as before. Finally, although less preferred, DCPD, maleic anhydride, water and glycol may be simultaneously reacted in a fashion similar to U.S. Pat. No. 4,148,765.

The vinyl ester resins (VER) useful herein are a well known class of resins made from unsaturated carboxylic acids and polyepoxides. Vinyl ester resins are the reaction product of about equivalent amounts of a monounsaturated monocarboxylic acid and a polyepoxide. One class of VER is described in U.S. Pat. No. 3,367,992 where dicarboxylic acid half esters of hydroxyalkyl acrylates or methacrylates are reacted with polyepoxide resins. Bowen in U.S. Pat. Nos. 3,066,122 and 3,179,623 describes the preparation of VER from monocarboxylic acids such as acrylic and methacrylic acid. Bowen also describes alternate methods of preparation wherein a glycidyl methacrylate or acrylate is reacted with the sodium salt of a dihydric phenol such as bisphenol A. VER based on epoxy novolac resins are described in U.S. Pat. No. 3,301,743 to Fekete, et al. Fekete, et al. describe VER where the molecular weight of the polyepoxide is increased by reacting a dicarboxylic acid with the polyepoxide resin as well as acrylic acid, etc. in U.S. Pat. No. 3,256,226. Other difunctional compounds containing a group which is reactive with an epoxide group, such as an amine, mercaptan, and the like, may be utilized in place of the dicarboxylic acid. All of the above-described resins, which contain the characteristic linkage

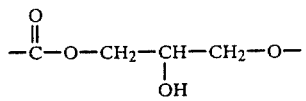

and terminal polymerizable vinylidene groups are classified as VER and are incorporated by reference.

Briefly, any of the known polyepoxides may be employed in the preparation of the vinyl ester resins. Useful polyepoxides are glycidyl polyethers of both polyhydric alcohols and polyhydric phenols, such as the diglycidyl ether of bisphenol A, epoxy novolacs, epoxidized fatty acids or drying oil acids, epoxidized diolefins, epoxidized di-unsaturated acid esters as well as epoxidized unsaturated polyester, so long as they contain more than one oxirane group per molecule. The polyepoxides may be monomeric or polymeric.

Preferred polyepoxides are glycidyl polyethers of polyhydric alcohols or phenols having weights per epoxide group of about 150 to 2000. The polyepoxides may be nuclearly substituted with halogen, preferably bromine. These polyepoxides are usually made by reacting at least about two moles of an epihalohydrin or glycerol dihalohydrin with one mole of the polyhydric alcohol or polyhydric phenol and a sufficient amount of a caustic alkali to combine with the halogen of the halohydrin. The products are characterized by the presence of more than one epoxide group per molecule, i.e., a 1,2-epoxy equivalency greater than one.

Vinyl ester resins are commercially available from The Dow Chemical Company under the trademark DERAKANE.

Any polymerizable ethylenically unsaturated monomer can be used herein. Such non-resinous ethylenically unsaturated monomers include both monovinyl and polyvinyl monomers. Typical monomers include the alkenyl aromatic monomers such as styrene, α-methylstyrene, chlorostyrene, divinylbenzene, vinyltoluene, t-butylstyrene, and the like; and alkyl and hydroxyalkyl esters of acrylic and methacrylic acid such as the methyl, ethyl, propyl, butyl, cyclohexyl, and hydroxyethyl esters. In addition to the above, other monomers that are especially useful for ultra-violet light curable systems such as 2-acetoxyalkyl acrylates, pentaerythritol di-, tri-, or tetra-acrylate may be used.

Suitable curing agents or catalysts which can be employed to cure the compositions of the present invention include, for example, free radical forming catalysts. Examples of these catalysts are benzoyl peroxide, tertiary butyl peroxide, methylethyl ketone peroxide, and the like. It is frequently of value to add accelerators such as cobalt naphthenate, dimethylaniline, and the like.

The compositions of the present invention are useful in the preparation of films, castings, laminates, coatings, molded products and the like. The compositions taught by this invention are especially suited for use in applications requiring improved flexibility in conjunction with enhanced impact strength. Typical of these applications are bulk and sheet molding compounds and the parts prepared from said compounds.

The following examples are illustrative of the present invention but are not to be construed as to limiting the scope thereof in any manner.

EXAMPLE 1

A. PREPARATION OF REACTIVE MONOMER

Toluene diisocyanate (0.255 mole, 44.41 grams), p-isopropenyl phenol (0.255 mole, 34.21 grams), and phenothiazine (0.055 weight percent, 0.167 grams) were added to a glass reactor and maintained under a nitrogen atmosphere with stirring. The toluene diisocyanate was an 80 to 20 weight percent mixture of the 2,4- and 2,6-isomers, respectively. The p-isopropenyl phenol contained less than 1.6 weight percent dimer and only a trace of residual phenol. The reactants were heated to 45° C. A catalyst package consisting of an organo tin salt commercially available from Witco Chemical Co. as Fomrez UL-28 (0.152 grams) and a tertiary amine commercially available from Abbot Labs as Polycat DBU (0.152 grams) was added to the stirred slurry and air cooling of the reactor exterior was started. A maximum exotherm of 82° C. occurred four minutes (240 s) later. Cooling reduced the reactor temperature to 60° C. and this reaction temperature was maintained for 56 minutes (3360 s). At this time, infrared spectrophotometric analysis of a film sample of the transparent, pale yellow-colored reaction product demonstrated that the reaction of the isocyanate with the phenolic hydroxyl was essentially complete (disappearance of hydroxyl group, appearance of carbonyl group). Polypropylene glycol (0.1275 mole, 225.0 grams) with an average molecular weight of 2000 was added to the reactor, followed by the addition of more catalyst, Witco Fomrez UL-28 (0.076 grams) and Polycat DBU (0.152 grams). A maximum exotherm of 68° C. occurred eleven minutes (660 s) later. Cooling reduced the reaction temperature to 65° C. and this reaction temperature was maintained for 3.8 hours (13680 s). At this time, infrared spectrophotometric analysis of a film sample of the white-colored, viscous liquid reaction product demonstrated that the reaction of the remaining isocyanate groups with the aliphatic hydroxyl group was complete. The reactor was cooled and a reactive monomer of the following statistical formula was recovered:

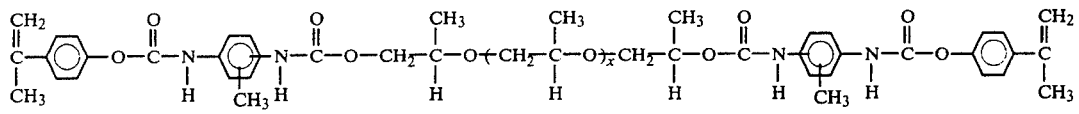

where x = about 34

B. PREPARATION OF DICYCLOPENTADIENE MODIFIED UNSATURATED POLYESTER RESIN

Maleic anhydride (7.0 moles, 686.42 grams) was added to a reactor and heated to a clear, stirred solution maintained at 100° C. under a nitrogen atmosphere. Water (7.1 moles, 127.94 grams) was added to the reactor. A maximum exotherm of 134° C. resulted two minutes (120 s) later, followed by a decrease in the reaction temperature to 121° C. fifteen minutes (900 s) after the initial water addition. At this time, dicyclopentadiene (2.10 moles, 277.64 grams) of 97 percent purity was added. A maximum exotherm of 125° C. resulted two minutes (120 s) later with a 120° C. temperature being re-established four minutes (240 s) after the initial dicyclopentadiene addition. Fifteen minutes (900 s) after the initial addition of dicyclopentadiene, a second portion of dicyclopentadiene (2.10 moles, 277.64 grams) was added. Fifteen minutes (900 s) later, a final aliquot of dicyclopentadiene (2.10 moles, 277.64 grams) was added and the temperature controller was maintained at 120° C. This temperature was re-established three minutes (180 s) later. After 30 minutes (1800 s), propylene glycol (4.20 moles, 319.62 grams) was added to the reactor and the steam condenser was started, nitrogen sparging was increased to 0.5 liter per minute (0.0083 l/s), and the temperature controller was set at 160° C. The 160° C. temperature was reached thirty-one minutes (1860 s) later. After two hours (7200 s) at 160° C., the temperature controller was set at 205° C, and this temperature was achieved thirty-two minutes (1920 s) later. After 6.1 hours (21960 s), a total of 141.5 milliliters of water layer and 14 milliliters of organic material were collected in the Dean Stark trap. The reactor was cooled to 165° C. and 100 ppm of hydroquinone was added. The dicyclopentadiene modified unsaturated polyester resin was recovered as a transparent, light yellow-colored solid with a final acid number of 26.8.

C. PREPARATION AND CURING OF CURABLE COMPOSITION

A curable mixture was prepared by blending together 199.5 grams of the modified polyester resin prepared in B above, 24.5 grams of the reactive monomer prepared in A above and 126.0 grams of styrene. This solution was used to determine Brookfield viscosity (25° C.), SPI gel characteristics (84° C.), average Barcol hardness (934-1 scale), and a clear, unfilled ⅛ inch (0.3175 cm) casting was made for heat distortion temperature (264 psi), tensile and flexural strength, flexural modulus, and percent elongation determinations. The clear casting was prepared using a cure system of 1.0% benzoyl peroxide and 0.05% N,N-dimethylaniline at room temperature (25° C.), followed by postcuring for 2.0 hours (7200 s) at 100° C. (212° F.). Mechanical properties of tensile (6) and flexural (6) test pieces were determined using an Instron machine with standard test methods (ASTM D-638 and D-790). Heat distortion temperature of clear casting test pieces (2) was determined using an Aminco Plastic Deflection Tester (American Instrument Co.) with standard test methods (ASTM D-648). The results are reported in Table I.

COMPARATIVE EXPERIMENT A

A portion of the modified unsaturated polyester resin (199.5 grams) of Example 1 and styrene (150.5 grams) were mixed. The physical and mechanical properties of the resin formulation were determined using the method of Example 1. The results are provided in Table I.

TABLE I

| | Example 1 | Comparative Experiment A |
|---|---|---|
| Brookfield Viscosity (cp) | 158 | 42 |
| SPI Gel Test | | |
| Gel time, min./sec. | 5.5/330 | 3.0/180 |
| Cure time, min./sec. | 11.0/660 | 5.5/330 |
| Maximum exotherm (°C.) | 176 | 226 |
| Average Barcol Hardness | 35 | 35 |
| Heat Distortion Temperature, °F./°C. | 190/87.8 | 238/114.4 |
| Tensile Strength, psi | 6,700 | 4,600 |
| kPa | 46,195 | 31,716 |
| Elongation (%) | 2.1 | 0.9 |
| Flexural Strength, psi | 14,600 | 9,700 |
| kPa | 100,664 | 66,880 |
| Flexural Modulus, psi | 430,000 | 610,000 |
| kPa | 2,964,764 | 4,205,828 |

EXAMPLE 2

A. PREPARATION OF VINYL ESTER RESIN

About 1 equivalent of methacrylic acid was reacted with 0.75 equivalent of an epoxy novolac having an epoxide equivalent weight (EEW) of 175–182 and 0.25 equivalent of a glycidyl polyether of bisphenol A having an EEW of 186–192. The above reactants are heated to 115° C. with catalyst (catalyst type known to previously cited art) and hydroquinone present until the carboxylic acid content reached about 1 percent. The reactants were cooled and then styrene (containing 50 ppm of t-butyl catechol) was added. The final vinyl ester resin diluted with styrene had a pH of 7.7 and contained approximately:

| Contents | % |
|---|---|
| styrene | 36 |
| methacrylic acid* | 20.6 |
| epoxy novolac* (EEW = 175–182) | 32.1 |
| diglycidyl ether of bisphenol A* (EEW = 186–192) | 11.3 |
| | 100.0 |

*Prereacted to form a vinyl ester resin

B. PREPARATION AND CURING OF CURABLE COMPOSITION

A portion of the above styrenated vinyl ester resin (350.0 grams) and a reactive monomer (18.42 grams) were formulated to provide a 95.0, 5.0% solution, respectively. The reactive monomer used in this formulation was the same as that described in Example 1-A.

The physical and mechanical properties of the resin formulation were determined using the method of Example 1. The results are reported in Table II.

COMPARATIVE EXPERIMENT B

A portion of the styrenated vinyl ester resin of Example 2 was used to determine physical and mechanical properties using the method of Example 1. The results are reported in Table II.

TABLE II

|  | Example 2 | Comparative Experiment B |
|---|---|---|
| Brookfield Viscosity (cp) | 253 | 260 |
| SPI Gel Test |  |  |
| Gel time, min./sec. | 8.2/492 | 8.0/480 |
| Cure time, min./sec. | 11.2/672 | 9.5/570 |
| Maximum exotherm (°C.) | 174 | 209 |
| Average Barcol Hardness | 41 | 39 |
| Heat Distortion Temperature, °F./°C. | 245/118.3 | 214/101.1 |
| Tensile Strength, psi | 8,800 | 9,000 |
| kPa | 60,674 | 63,053 |
| Elongation (%) | 3.1 | 2.8 |
| Flexural Strength, psi | 18,100 | 19,200 |
| kPa | 124,796 | 132,380 |
| Flexural Modulus, psi | 490,000 | 640,000 |
| kPa | 3,378,452 | 4,412,672 |

EXAMPLE 3

A styrenated commercial grade unsaturated isophthalic polyester resin (350.0 grams) prepared by the reaction of isophthalic acid, maleic anhydride, and propylene glycol was formulated with a reactive monomer (28.39 grams). The reactive monomer used in this formulation was the same as that described in Example 1. The physical and mechanical properties of the resin formulation were determined using the method of Example 1. The results are reported in Table III.

COMPARATIVE EXPERIMENT C

A portion of the styrenated commercial grade unsaturated isophthalic polyester resin of Example 3 was used to determine physical and mechanical properties using the method of Example 1. The results are reported in Table III.

TABLE III

|  | Example 3 | Comparative Experiment C |
|---|---|---|
| Brookfield Viscosity (cp) | 2313 | 224 |
| SPI Gel Test |  |  |
| Gel time, min./sec. | 2.6/156 | 4.1/246 |
| Cure time, min./sec. | 7.6/456 | 6.1/366 |
| Maximum exotherm (°C.) | 111 | 215 |
| Average Barcol Hardness | 19 | 47 |
| Heat Distortion Temperature, °F./°C. | 162/72.2 | 208/97.8 |
| Tensile Strength, psi | 6,000 | 9,700 |
| kPa | 41,369 | 66,880 |
| Elongation (%) | 2.7 | 2.1 |
| Flexural Strength, psi | 11,600 | 21,700 |
| kPa | 79,980 | 149,617 |
| Flexural Modulus, psi | 380,000 | 620,000 |
| kPa | 2,620,024 | 4,274,776 |

EXAMPLE 4

A. PREPARATION OF DICYCLOPENTADIENE MODIFIED UNSATURATED POLYESTERAMIDE RESIN

Maleic anhydride (7.0 moles, 686.42 grams) was added to a reactor and heated to a clear, stirred solution maintained at 100° C. under a nitrogen atmosphere. Water (7.1 moles, 127.94 grams was added to to the reactor. A maximum exotherm of 131° C. resulted two minutes (120 s) later, followed by a decrease in the reaction temperature to 121° C. fifteen minutes (900 s) after the initial water addition. At this time, dicyclopentadiene (2.10 moles, 277.64 grams) of 97 percent purity was added. A maximum exotherm of 125° C. resulted two minutes (120 s) later with a 120° C. being re-established two minutes (120 s) after the initial dicyclopentadiene addition. Fifteen minutes (900 s) after the initial addition of dicyclopentadiene, a second portion of dicyclopentadiene (2.10 moles, 277.64 grams) was added. Fifteen minutes (900 s) later, a final aliquot of dicyclopentadiene (2.10 moles, 277.64 grams) was added and the temperature controller was maintained at 120° C. This temperature was re-established three minutes (180 s) later. After 30 minutes (1800 s), propylene glycol (3.78 moles, 287.66 grams) and piperazine (0.420 moles, 36.18 grams) were added to the reactor and the steam condenser was started, nitrogen sparging was increased to 0.75 liter per minute (0.0125 l/s), and the temperature controller was set at 160° C. The 160° C. temperature was reached twenty-five minutes (1500 s) later. After two hours (7200 s) at 160° C., the temperature controller was set at 205° C., and this temperature was achieved twenty-eight minutes (1680 s) later. After 14.0 hours (50,400 s), a total of 151 milliliters of water layer and 28 milliliters of organic material were collected in the Dean Stark trap. The reactor was cooled to 165° C. and 100 ppm of hydroquinone was added. The dicyclopentadiene modified unsaturated polyesteramide resin was recovered as a transparent, light yellow-colored solid with a final acid number of 18.9.

B. PREPARATION AND CURING OF CURABLE COMPOSITION

A portion of the modified unsaturated polyesteramide resin (199.5 grams), styrene (126.0 grams), and a reactive monomer (24.5 grams) were formulated to provide a 57.0, 36.0, 7.0% solution, respectively. The reactive monomer used in this formulation was the same as that described in Example 1-A. The physical and mechanical properties of the resin formulation were determined using the method of Example 1. The results are reported in Table IV.

COMPARATIVE EXPERIMENT D

A portion of the modified unsaturated polyesteramide resin (199.5 grams) of Example 4 and styrene (150.5 grams) were formulated to provide a 57.0, 43.0% solution, respectively. The physical and mechanical properties of the resin formulation were determined using the method of Example 4. The results are reported in Table IV.

TABLE IV

|  | Example 4 | Comparative Experiment D |
|---|---|---|
| Brookfield Viscosity (cp) | 669 | 184 |
| SPI Gel Test |  |  |
| Gel time, min./sec. | 5.4/324 | 2.7/162 |
| Cure time, min./sec. | 9.6/576 | 4.9/294 |
| Maximum exotherm (°C.) | 179 | 221 |
| Average Barcol Hardness | 36 | 46 |
| Heat Distortion Temperature, °F./°C. | 212/100 | 239/115 |
| Tensile Strength, psi | 6,000 | 5,100 |
| kPa | 41,369 | 35,163 |
| Elongation (%) | 1.9 | 1.1 |

TABLE IV-continued

|  | Example 4 | Comparative Experiment D |
|---|---|---|
| Flexural Strength, psi | 9,700 | 14,500 |
| kPa | 66,880 | 99,975 |
| Flexural Modulus, psi | 410,000 | 590,000 |
| kPa | 2,826,868 | 4,067,932 |

EXAMPLE 5

Ten 2.5 by 0.5 by 0.125 inch (6.35×1.27×0.3175 cm) test pieces were prepared from each of the clear, unfilled castings of Examples 1 through 4 and Comparative Experiments A through D. Each series of test pieces were tested for unnotched Izod impact using a TMI Impact Tester No. 43-1 with standard test methods (ASTM D-256). The results are reported in Table V.

TABLE V

|  | Unnotched Izod Impact ft-lbs/in (J/cm) |
|---|---|
| Example 1 | 1.6 (5.5) |
| Comparative Experiment A | 1.0 (3.4) |
| Example 2 | 1.4 (4.8) |
| Comparative Experiment B | 1.9 (6.5) |
| Example 3 | 2.4 (8.3) |
| Comparative Experiment C | 2.9 (10.1) |
| Example 4 | 1.7 (5.9) |
| Comparative Experiment D | 1.0 (3.4) |

EXAMPLE 6

A portion of the dicyclopentadiene modified unsaturated polyester of Example 1-B (57.0 grams), the reactive monomer prepared in Example 1-A (7.5 grams), and styrene (36.0 grams) were formulated to provide a 57.0, 7.5, 36.0% solution, respectively. This solution was used to prepare a 0.0625 inch (0.15875 cm) clear, unfilled casting and cured using the method of Example 1. A test piece was prepared from the clear, unfilled casting to have the following measurements: 6.5 inches (16.51 cm) length, 0.625 inch (1.5875 cm) width at tab ends, routed to a 0.400 inch (1.016 cm) width at center. The test piece was used for plane strain compression testing with applied tension using the methods of P. B. Bowden and J. A. Jukes reported in Journal of Material Science 3, 183 (1968) and 7, 52 (1972). Sample cross-sectional area was 0.025 square inch (0.16129 cm²) and tensile load was increased by 564 psi (3889 kPa) increments. The creep rate taken as yield was approximately 0.002 inch per minute (0.3048 cm/sec). Tension (psi) versus compression (psi) yield point values thus obtained were plotted. Tensile and compressive yield strength values were determined by extrapolation of the plotted biaxial yield line. Ductility was calculated as the ratio of compression at break to the compressive yield strength then that value was subtracted from one. The results are reported in Table VI.

COMPARATIVE EXPERIMENT E

A portion of the dicyclopentadiene modified unsaturated polyester of Example 1-B (57.0 grams) and styrene (43.0 grams) were formulated to provide a 57.0, 43.0% solution, respectively. Plane strain compression testing with applied tension was completed using the method of Example 6. The results are reported in Table VI.

TABLE VI

|  | Example 6 | Comparative Experiment E |
|---|---|---|
| Ductility | 0.67 | 0.07 |
| Tension at Break, psi | 6,773 | 869 |
| kPa | 46,699 | 5,992 |
| Compression at Break, psi | 5,084 | 19,011 |
| kPa | 35,053 | 131,077 |
| Tensile Yield Strength, psi | 10,100 | * |
| kPa | 69,638 |  |
| Compressive Yield Strength, psi | 15,407 | 20,382 |
| kPa | 106,228 | 140,530 |

*Could not be extrapolated accurately with datapoints collected.

EXAMPLE 7

A portion of the styrenated commercial grade unsaturated isophthalic polyester resin of Example 3 (92.5 grams) and the reactive monomer prepared in Example 1-A (7.5 grams) were formulated to provide a 92.5, 7.5% solution, respectively. Plane strain compression testing with applied tension was completed using the method of Example 6. The results are reported in Table VII.

COMPARATIVE EXPERIMENT F

A portion of the styrenated commercial grade unsaturated isophthalic polyester resin of Example 3 was used in plane strain compression testing with applied tension using the method of Example 6. The results are reported in Table VII.

TABLE VII

|  | Example 7 | Comparative Experiment F |
|---|---|---|
| Ductility | 0.62 | 0.49 |
| Tension at Break, psi | 3,269 | 7,030 |
| kPa | 22,539 | 48,470 |
| Compression at Break, psi | 1,200 | 10,523 |
| kPa | 8,274 | 72,554 |
| Tensile Yield Strength, psi | 5,300 | 14,500 |
| kPa | 36,542 | 99,975 |
| Compressive Yield Strength, psi | 7,432 | 20,500 |
| kPa | 51,242 | 141,343 |

EXAMPLE 8

A. PREPARATION OF REACTIVE MONOMER

A reactive monomer was prepared wherein toluene diisocyanate and polypropylene glycol with an average molecular weight of 2000 were first reacted, followed by reaction with p-isopropenyl phenol. The reaction was specifically performed as follows:

Polypropylene glycol (0.06375 mole, 127.50 grams) with an average molecular weight of 2000 and containing dissolved stannous octoate catalyst (0.104 gram) was added over a thirty minute (1800 s) period to a glass reactor containing toluene diisocyanate (0.1275 mole, 22.21 grams) maintained under a nitrogen atmosphere with stirring. The toluene diisocyanate was an 80 to 20 weight percent mixture of the 2,4- and 2,6-isomers, respectively. The p-isopropenyl phenol contained less than 1.6 weight percent dimer and only a trace of residual phenol. After the addition of the polypropylene glycol and stannous octoate solution was complete, the reaction temperature was increased to 60° C. After three hours (10,800 s) at the 60° C. reaction temperature, infrared spectrophotometric analysis of a film sample of the transparent reaction product demonstrated that the reaction of the isocyanate with the aliphatic hydroxyl group was complete (disappearance of hydroxyl group, appearance of carbonyl group). p-Isopropenyl phenol (0.1275 mole, 17.11 grams) was added to the reactor followed by the addition of an additional catalyst, a tertiary amine commercially available from Abbot Labs as Polycat DBU (0.076 gram). The reaction temperature was increased to 90° C. and this reaction temperature was maintained for two hours (7200 s). At this time, infrared spectrophotometric analysis of a film sample of the transparent, gelatinous reaction product demonstrated that the reaction of the remaining isocyanate groups with the phenolic hydroxyl group was complete. Hydroquinone (100 ppm) was added to the reactor and the reactive monomer was recovered.

B. PREPARATION AND CURING OF CURABLE COMPOSITION

A portion of the reactive monomer (10.53 grams) prepared in A. above and a portion of the styrenated vinyl ester resin (350.0 grams) from Example 2 were formulated to provide a 2.92, 97.08% solution, respectively. The physical and mechanical properties of the resin formulation were determined using the method of Example 1. The unnotched Izod impact was determined using the method of Example 5. The results are reported in Table VIII.

EXAMPLE 9

A portion of the reactive monomer (17.9 grams) from Example 8-A and a portion of the styrenated vinyl ester resin (350.0 grams) from Example 2 were formulated to provide a 4.88, 95.12% solution, respectively. The physical and mechanical properties of the resin formulation were determined using the method of Example 1. The unnotched Izod impact was determined using the method of Example 5. The results are reported in Table VIII.

TABLE VIII

|  | Ex. 8 | Ex. 9 | Comp. Expt. B |
|---|---|---|---|
| Brookfield Viscosity, cp | 204 | 271 | 260 |
| SPI Gel Test |  |  |  |
| gel time, min./sec. | 11.3/678 | 15.4/924 | 8.0/480 |
| cure time, min./sec. | 13.6/816 | 21.5/1290 | 9.5/570 |
| maximum exotherm (°C.) | 190/11400 | 162/9720 | 209/12540 |
| Average Barcol Hardness | 41 | 30 | 39 |
| Heat Distortion Temperature, °F./°C. | 214/101 | 185/85 | 214/101 |
| Tensile Strength psi | 10,100 | 8,400 | 9,000 |
| kPa | 69,638 | 57,916 | 62,053 |
| Elongation (%) | 3.9 | 4.0 | 2.8 |
| Flexural Strength, psi | 14,800 | 14,500 | 19,200 |
| kPa | 102,043 | 99,975 | 132,380 |
| Flexural Modulus, psi | 550,000 | 440,000 | 640,000 |
| kPa | 3,792,140 | 3,033,712 | 4,412,672 |
| Izod Impact (unnotched), |  |  |  |
| ft-lbs/in. | 4.1 | 4.5 | 1.9 |
| J/cm | 14.1 | 15.5 | 6.5 |

I claim:
1. A polymerizable ethyleneically unsaturated monomer resulting from reacting
(A) an aromatic material containing, per molecule, one polymerizable ethylenically unsaturated group and one group containing a hydrogen atom reactive with —NCO and/or —NCS groups, which material is represented by the formula

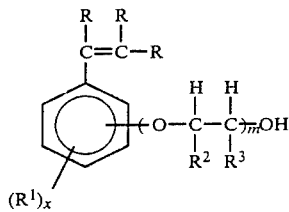

wherein each R and $R^1$ group is independently selected from hydrogen or a saturated hydrocarbyl group having from 1 to about 10, carbon atoms; each $R^2$ and $R^3$ is independently hydrogen or an alkyl group having from 1 to about 4 carbon atoms; n has a value from zero to about 100 and x has a value from zero to 3;

(B) a material containing at least one oxyalkylene group and is terminated in a group having at least one hydrogen atom which reactive with —NCO and/or —NCS groups; and (C) a material having an average of more than one —NCO and/or —NCS group per molecule; and wherein the components are employed in quantities which provides an equivalent ratio of A:B of from about 0.1:1 to about 5:1, and an equivalent ratio of C:B of from about 0.1:1 to about 5:1.

2. A polymerizable ethylenically unsaturated monomer of claim 1 wherein
(i) component (B) is terminated in at least one hydroxyl, primary amine or secondary amine group;
(ii) components (A) and (B) are employed in quantities which provides an equivalent ratio of A:B of from about 1:1 to about 3:1; and
(iii) components (B) and (C) are employed in quantities which provide an equivalent ratio of C:B of from about 1:1 to about 3:1.

3. A polymerizable ethylenically unsaturated monomer of claim 2 wherein
(i) in component (A) each R and $R^1$ group is independently selected from hydrogen or a saturated hydrocarbyl group having from 1 to about 4 carbon atoms;
(ii) the components are employed in quantities which provide an equivalent ratio of A:B of from about 1.75:1 to about 2.25:1 and an equivalent ratio of C:B of from about 1.75:1 to about 2.25:1.

4. A polymerizable ethylenically unsaturated monomer of claim 3 wherein
(i) component (A) is p-isopropenylphenol, m-vinylphenol, m-isopropenyl phenol, the monoethoxylate of p-isopropenylphenol, the polypropoxylate of p-isopropenylphenol;
(ii) component (B) is diethylene glycol, tripropylene glycol, polyethylene glycol, polypropylene glycol, the polypropoxylate of glycerin; and
(iii) component (C) is 2,4-toluenediisocyanate, 2,6-toluenediisocyanate, p,p'-diphenylmethanediisocyanate, the diisocyanate of bis(amino)-dimethylthiabicyclononane.

5. A polymer prepared by polymerizing at least one polymerizable ethylenically unsaturated monomer of claim 1 in the presence of a catalytic quantity of a suitable catalyst and optionally in the presence of one or more non-resinous monomer(s) containing a polymerizable ethylenically unsaturated group.

6. A polymer prepared by polymerizing at least one polymerizable ethylenically unsaturated monomer of claim 2 in the presence of a catalytic quantity of a suitable catalyst and optionally in the presence of one or more non-resinous monomer(s) containing a polymerizable ethylenically unsaturated group.

7. A polymer prepared by polymerizing at least one polymerizable ethylenically unsaturated monomer of claim 3 in the presence of a catalytic quantity of a suitable catalyst and optionally in the presence of one or more non-resinous monomer(s) containing a polymerizable ethylenically unsaturated group.

8. A polymer prepared by polymerizing at least one polymerizable ethylenically unsaturated monomer of claim 4 in the presence of a catalytic quantity of a suitable catalyst and optionally in the presence of one or more non-resinous monomer(s) containing a polymerizable ethylenically unsaturated group.

9. A composition which when admixed with a suitable quantity of a catalyst system therefor thermosets to a cured condition, which composition comprises
   (A) a mixture of such resins;
   (B) at least one polymerizable ethylenically unsaturated monomer of claim 1; and
   (C) a polymerizable ethylenically unsaturated non-resinous monomer different from Component (B); and wherein
      (i) Component (A) is present in a quantity of from about zero to about 95 percent by weight of the combined weight of Components (A), (B) and (C);
      (ii) Component (B) is present in quantities of from about 1 to about 95 percent by weight of the combined weight of Components (A), (B) and (C); and
      (iii) Component (C) is present in quantities of from zero to about 95 percent by weight of the combined weight of Components (A), (B) and (C).

10. A composition of claim 9 wherein
   (i) Component (A) is present in a quantity of from about 20 to about 80 percent by weight of the combined weight of Components (A), (B) and (C);
   (ii) Component (B) is present in quantities of from about 1 to about 25 percent by weight of the combined weight of Components (A), (B) and (C); and
   (iii) Component (C) is present in quantities of from 15 to about 75 percent by weight of the combined weight of Components (A), (B) and (C).

11. A composition of claim 10 wherein
   (i) Component (A) is present in a quantity of from about 40 to about 60 percent by weight of the combined weight of Components (A), (B) and (C);
   (ii) Component (B) is present in quantities of from about 1 to about 15 percent by weight of the combined weight of Components (A), (B) and (C); and
   (iii) Component (C) is present in quantities of from 25 to about 55 percent by weight of the combined weight of Components (A), (B) and (C).

12. A composition which when admixed with a suitable quantity of a catalyst system therefor thermosets to a cured condition, which composition comprises
   (A) a vinyl ester resin or mixture such resins;
   (B) at least one polymerizable ethylenically unsaturated monomer of claim 2; and
   (C) a polymerizable ethylenically unsaturated monomer different from Component (B); and wherein
      (i) Component (A) is present in a quantity of from about zero to about 95 percent by weight of the combined weight of Components (A), (B) and (C);
      (ii) Component (B) is present in quantities of from about 1 to about 95 percent by weight of the combined weight of Components (A), (B) and (C); and
      (iii) Component (C) is present in quantities of from zero to about 95 percent by weight of the combined weight of Components (A), (B) and (C).

13. A composition of claim 12 wherein
   (i) Component (A) is present in a quantity of from about 20 to about 80 percent by weight of the combined weight of Components (A), (B) and (C);
   (ii) Component (B) is present in quantities of from about 1 to about 25 percent by weight of the combined weight of Components (A), (B) and (C); and
   (iii) Component (C) is present in quantities of from 15 to about 75 percent by weight of the combined weight of Components (A), (B) and (C).

14. A composition of claim 13 wherein
   (i) Component (A) is present in a quantity of from about 40 to about 60 percent by weight of the combined weight of Components (A), (B) and (C);
   (ii) Component (B) is present in quantities of from about 1 to about 15 percent by weight of the combined weight of Components (A), (B) and (C); and
   (iii) Component (C) is present in quantities of from 25 to about 55 percent by weight of the combined weight of Components (A), (B) and (C).

15. A composition which when admixed with a suitable quantity of a catalyst system therefor thermosets to a cured condition, which composition comprises
   (A) a vinyl eser resin or mixture such resins;
   (B) at least one polymerizable ethylenically unsaturated monomer of claim 3; and
   (C) a polymerizable ethylenically unsaturated monomer different from Component (B); and wherein
      (i) Component (A) is present in a quantity of from about zero to about 95 percent by weight of the combined weight of Components (A), (B) and (C);
      (ii) Component (B) is present in quantities of from about 1 to about 95 percent by weight of the combined weight of Components (A), (B) and (C); and
      (iii) Component (C) is present in quantities of from zero to about 95 percent by weight of the combined weight of Components (A), (B) and (C).

16. A composition of claim 15 wherein
   (i) Component (A) is present in a quantity of from about 20 to about 80 percent by weight of the combined weight of Components (A), (B) and (C);
   (ii) Component (B) is present in quantities of from about 1 to about 25 percent by weight of the combined weight of Components (A), (B) and (C); and
   (iii) Component (C) is present in quantities of from 15 to about 75 percent by weight of the combined weight of Components (A), (B) and (C).

17. A composition of claim 16 wherein
   (i) Component (A) is present in a quantity of from about 40 to about 60 percent by weight of the combined weight of Components (A), (B) and (C);
   (ii) Component (B) is present in quantities of from about 1 to about 15 percent by weight of the combined weight of Components (A), (B) and (C); and
   (iii) Component (C) is present in quantities of from 25 to about 55 percent by weight of the combined weight of Components (A), (B) and (C).

18. A composition which when admixed with a suitable quantity of a catalyst system therefor thermosets to a cured condition, which composition comprises
(A) a vinyl ester resin or mixture such resins;
(B) at least one polymerizable ethylenically unsaturated monomer of claim 4; and
(C) a polymerizable ethylenically unsaturated monomer different from Component (B); and wherein
   (i) Component (A) is present in a quantity of from about zero to about 95 percent by weight of the combined weight of Components (A), (B) and (C);
   (ii) Component (B) is present in quantities of from about 1 to about 95 percent by weight of the combined weight of Components (A), (B) and (C); and
   (iii) Component (C) is present in quantities of from zero to about 95 percent by weight of the combined weight of Components (A), (B) and (C).

19. A composition of claim 18 wherein
(i) Component (A) is present in a quantity of from about 20 to about 80 percent by weight of the combined weight of Components (A), (B) and (C);
(ii) Component (B) is present in quantities of from about 1 to about 25 percent by weight of the combined weight of Components (A), (B) and (C); and
(iii) Component (C) is present in quantities of from 15 to about 75 percent by weight of the combined weight of Components (A), (B) and (C).

20. A composition of claim 19 wherein
(i) Component (A) is present in a quantity of from about 40 to about 60 percent by weight of the combined weight of Components (A), (B) and (C);
(ii) Component (B) is present in quantities of from about 1 to about 15 percent by weight of the combined weight of Components (A), (B) and (C); and
(iii) Component (C) is present in quantities of from 25 to about 55 percent by weight of the combined weight of Components (A), (B) and (C).

21. Cured products resulting from curing the compositions of claim 9 with a suitable quantity for catalyst system therefor.

22. Cured products resulting from curing the compositions of claim 10 with a suitable quantity for catalyst system therefor.

23. Cured products resulting from curing the compositions of claim 11 with a suitable quantity for catalyst system therefor.

24. Cured products resulting from curing the compositions of claim 12 with a suitable quantity for catalyst system therefor.

25. Cured products resulting from curing the compositions of claim 13 with a suitable quantity for catalyst system therefor.

26. Cured products resulting from curing the compositions of claim 14 with a suitable quantity for catalyst system therefor.

27. Cured products resulting from curing the compositions of claim 15 with a suitable quantity for catalyst system therefor.

28. Cured products resulting from curing the compositions of claim 16 with a suitable quantity for catalyst system therefor.

29. Cured products resulting from curing the compositions of claim 17 with a suitable quantity for catalyst system therefor.

30. Cured products resulting from curing the compositions of claim 18 with a suitable quantity for catalyst system therefor.

31. Cured products resulting from curing the compositions of claim 19 with a suitable quantity for catalyst system therefor.

32. Cured products resulting from curing the compositions of claim 20 with a suitable quantity for catalyst system therefor.

* * * * *

UNITED STATES PATENT AND TRADEMARK OFFICE
CERTIFICATE OF CORRECTION

PATENT NO. : 4,486,582   Page 1 of 2
DATED : December 4, 1984
INVENTOR(S) : Robert E. Hefner, Jr.

It is certified that error appears in the above—identified patent and that said Letters Patent is hereby corrected as shown below:

Col. 1, line 38; delete the first occurrence of "about".

Col. 5, line 37; change "dicylopentadiene" to --dicyclopentadiene--.

Col. 11, Table III, first column, eighth line, change "°F./C." to --°F/°C--.

Col. 12, line 2; change "grams" to --grams)--.

Col. 12, line 2; delete the second occurrence of "to".

Col. 15, Table VIII, first column, ninth line; insert a comma --,-- after "Strength".

Col. 15, line 62; change "ethyleneically" to --ethylenically--.

UNITED STATES PATENT AND TRADEMARK OFFICE
CERTIFICATE OF CORRECTION

PATENT NO. : 4,486,582

DATED : December 4, 1984

INVENTOR(S) : Robert E. Hefner, Jr.

It is certified that error appears in the above—identified patent and that said Letters Patent is hereby corrected as shown below:

Col. 16, lines 1-10; the formula should read as follows:

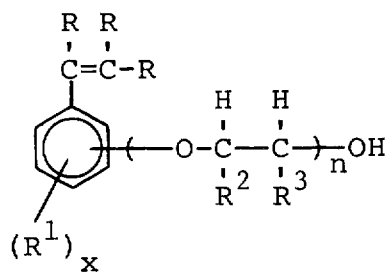

Col. 16, line 21; insert --is-- between "which" and "reactive".

Col. 17, line 22; insert --vinyl ester resin or-- between "a" and "mixture".

Col. 18, line 33; change "eser" to --ester--.

Signed and Sealed this

Twenty-eighth Day of May 1985

[SEAL]

Attest:

DONALD J. QUIGG

Attesting Officer   Acting Commissioner of Patents and Trademarks